(12) United States Patent
Zitouni et al.

(10) Patent No.: US 10,229,212 B2
(45) Date of Patent: Mar. 12, 2019

(54) IDENTIFYING ABANDONMENT USING GESTURE MOVEMENT

(71) Applicant: Microsoft Technology Licensing, LLC, Redmond, WA (US)

(72) Inventors: Imed Zitouni, Bellevue, WA (US); Ahmed Hassan Awadallah, Redmond, WA (US); Aidan Crook, Los Altos, CA (US); Bradley Wethington, Seattle, WA (US); Kyle Williams, State College, PA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 356 days.

(21) Appl. No.: 15/231,123

(22) Filed: Aug. 8, 2016

(65) Prior Publication Data

US 2017/0293691 A1     Oct. 12, 2017

Related U.S. Application Data

(60) Provisional application No. 62/320,201, filed on Apr. 8, 2016.

(51) Int. Cl.
*G06F 17/30* (2006.01)
*G06N 99/00* (2019.01)

(52) U.S. Cl.
CPC ..... *G06F 17/30867* (2013.01); *G06N 99/005* (2013.01)

(58) Field of Classification Search
CPC . G06Q 30/0625; G06F 17/3048; G06F 21/32; G06F 17/30389; G06F 17/30867
See application file for complete search history.

(56) References Cited

U.S. PATENT DOCUMENTS

| | | |
|---|---|---|
| 6,577,329 B1 | 6/2003 | Flickner et al. |
| 7,685,192 B1 | 3/2010 | Scofield et al. |
| 7,716,218 B1 | 5/2010 | Pogue |
| 7,756,887 B1 | 7/2010 | Haveliwala |
| 7,827,170 B1 | 11/2010 | Horling et al. |

(Continued)

FOREIGN PATENT DOCUMENTS

WO     2007134021 A1     11/2007

OTHER PUBLICATIONS

Arroyo, et al., "Usability tool for analysis of web designs using mouse tracks", CHI '06, Apr. 22-27, 2006, Montreal, Quebec, Canada, 6 pages.

(Continued)

*Primary Examiner* — Etienne P Leroux

(57) ABSTRACT

Examples of the present disclosure describe systems and methods of identifying good and bad abandonment using gesture movement. In aspects, user feedback signals may be received by a client device in response to the viewing and/or navigation of query results. The feedback signals may be provided to a framework for determining and/or analyzing query abandonment. The framework may identify gesture data in the feedback signals and extract feature data from the gesture data. The feature data may be provided to a metrics component to determine metrics and/or satisfaction values for the feature data. The metrics and/or feature data may be used to train a predictive model to identify good abandonment in query results.

20 Claims, 8 Drawing Sheets

(56) References Cited

U.S. PATENT DOCUMENTS

| | | | |
|---|---|---|---|
| 8,060,524 B2 | 11/2011 | Schechter et al. | |
| 8,065,316 B1 | 11/2011 | Baker et al. | |
| 8,090,703 B1 | 1/2012 | Agarwal et al. | |
| 8,117,197 B1 | 2/2012 | Cramer | |
| 8,645,288 B2 | 2/2014 | Wang et al. | |
| 2002/0174201 A1 | 11/2002 | Ramer et al. | |
| 2005/0210024 A1 | 9/2005 | Hurst-Hiller | |
| 2006/0064411 A1 | 3/2006 | Gross et al. | |
| 2006/0173828 A1 | 8/2006 | Rosenberg | |
| 2007/0226189 A1 | 9/2007 | Piekos et al. | |
| 2008/0263025 A1 | 10/2008 | Koran | |
| 2008/0319842 A1 | 12/2008 | O'Sullivan et al. | |
| 2009/0254550 A1 | 10/2009 | Choi et al. | |
| 2009/0282023 A1 | 11/2009 | Bennett | |
| 2009/0319495 A1 | 12/2009 | Anderson | |
| 2010/0153428 A1 | 6/2010 | Schechter et al. | |
| 2010/0262457 A1 | 10/2010 | House | |
| 2010/0295774 A1 | 11/2010 | Hennessey | |
| 2010/0299350 A1 | 11/2010 | Konig et al. | |
| 2012/0198347 A1 | 8/2012 | Hirvonen et al. | |
| 2012/0246165 A1 | 9/2012 | Batraski | |
| 2012/0296930 A1* | 11/2012 | Lewak | G06F 17/3048 707/769 |
| 2013/0246383 A1 | 9/2013 | White et al. | |
| 2014/0053091 A1* | 2/2014 | Hou | G06F 17/30389 715/769 |
| 2014/0214483 A1 | 7/2014 | Minnis | |
| 2014/0300554 A1* | 10/2014 | Samuel | G06F 21/32 345/173 |
| 2016/0313888 A1* | 10/2016 | Rajasekar | G06Q 30/0625 |

OTHER PUBLICATIONS

Atterer, et al., "Knowing the User's Every Move: User Activity Tracking for Website Usability Evaluation and Implicit Interaction", In the Proceedings of the 15th International Conference on World Wide Web, May 23-26, 2006, 10 pages.

Aula, et al., "Eye-Tracking Reveals the Personal Styles for Search Result Evaluation", In the Proceedings of Human-Computer Interaction—Interact 2005, Sep. 12-16, 2005, 4 pages.

Bhavnani, Su Resh, "Important cognitive components of domain-specific search knowledge", TREC 2001, 10 pages.

Buscher, et al., "Eye movements as implicit relevance feedback", CHI 2008 Proceedings, Apr. 5-10, 2008, Florence, Italy, 6 pages.

Buscher, et al., "Large-Scale Analysis of Individual and Task Differences in Search Result Page Examination Strategies", WSDM '12, Feb. 8-12, 2012, Seattle, WA, 10 pages.

Buscher, et al., "Segment-Level Display Time as Implicit Feedback: A Comparison to Eye Tracking", In the Proceedings of the 32nd International ACM SIGIR Conference on Research and Development in Information Retrieval, Jul. 19-23, 2009, pp. 67-74.

Buscher, et al., "The good, the bad,and the random: An eye-tracking study of ad quality in web search", SIGIR '10, Jul. 19-23, 2010, Geneva, Switzerland, 8 pages.

Buscher, et al., "What do you see when you're surfing? Using eye tracking to predict salient regions of web pages", CHI '09, Apr. 4-9, 2009, Boston, Massachusetts, 10 pages.

Bystrom, et al., "Task complexity affects information seeking and use", IPM, 1995, 31(2), 35 pages.

Chapelle, et al., "A Dynamic Bayesian Network Click Model for Web Search Ranking" In the Proceedings of the 18th International Conference on World Wide Web, Apr. 20-24, 2009, 10 pages.

Chen, et al., "What can a mouse cursor tell us more?: Correlation of eye/mouse movements on web browsing", CHI 2001, Mar. 31-Apr. 5, 2001, 2 pages.

Claypool, et al.,"Implicit Interest Indicators", IUI '01, Jan. 14-17, 2001, Santa Fe, New Mexico, 8 pages.

Cole et al., "Task and User Effects on Reading Patterns in Information Search", Interacting with Computers vol. 23, Issue 4, May 27, 2011, 17 pages.

Cooke, Lynne, "Is the Mouse a Poor Man's Eye Tracker:?", In the Proceedings of Society for Technical Communication 2006, May 2006, pp. 252-255.

Craswell, et al., "An experimental comparison of click position-bias models", WSDM '08, Feb. 11-12, 2008, Palo Alto, CA, 8 pages.

Cutrell, et al., "What are you looking for?: An eye-tracking study of information usage in web search", CHI '07, Apr. 28-May 3, 2007, San Jose, CA, 10 pages.

Dou, et al., "A large-scale evaluation and analysis of personalized search strategies", WWW 2007, May 8-12, 2007, Banff, Alberta, Canada, 10 pages.

Downey, et al., "Understanding the relationship between searchers' queries and information goals", CIKM, Oct. 26-30, 2008, Napa Valley, CA, 10 pages.

Dumais, et al., "Individual differences in gaze patterns for web search", IliX 2010, Aug. 18-22, 2010, New Brunswick, NJ, 10 pages.

Goecks, et al., "Learning users' interests by unobtrusively observing their normal behavior", IUI 2000, 4 pages.

Granka et al., "Eyetracking in Online Search", Retrieved on: Oct. 10, 2011, 27 pages. Available at: http://laura.granka.com/publications/granka_ etal08book.pdf.

Guan, et al., "An eye tracking study of the effect of target rank on web search", CHI, Apr. 28-May 3, 2007, San Jose, CA, 5 pages.

Guo, et al., "Click Chain Model in Web Search" In the Proceedings of the 18th International Conference on World Wide Web, Apr. 20-24, 2009, pp. 11-20.

Guo, et al., "Towards predicting web searcher gaze position from mouse movements", CHI 2010, Apr. 10-15, 2010, Atlanta, GA, 6 pages.

Guo, et al.,"Exploring mouse movements for inferring query intent", SIGIR '08, Jul. 20-24, 2008, Singapore, 2 pages.

Hauger, et al., Using Browser Interaction Data to Determine Page Reading Behavio~, In the Proceedings of the 19th International Conference on User Modeling, Adaption, and Personalization, Jul. 11-15, 2011, 12 pages.

Hijikata, et al., "Implicit user profiling for on demand relevance feedback", IUI '04, Jan. 13-16, 2004, Madeira, Funchal, Portugal, 8 pages.

Huang, "Optimal strategies for reviewing search results", AAAI 2010, 6 pages.

Huang, et al., "No Clicks, No Problem: Using Cursor Movements to Understand and Improve Search", CHI 2011, May 7-12, 2011, Vancouver, BC, Canada, 10 pages.

Huang, et al., "User See, User Point: Gaze and Cursor Alignment in Web Search", CHI '12, May 5-10, 2012, Austin, Texas, 10 pages.

Jagacinski, et al., "Fitts' law and the microstructure of rapid discrete movements", Journal of Experimental Psychology and Performance, vol. 6 (2), May 1980, 1 page. Abstract only.

Joachims, et al., "Accurately interpreting clickthrough data as implicit feedback", SIGIR, Aug. 15-19, 2005, Salvador, Brazil, 8 pages.

Joachims, et al., "Evaluating the accuracy of implicit feedback from clicks and query reformulations in Web search", ACM Transactions on Information Systems, vol. 25, No. 2, Apr. 2007, Article 7, 26 pages.

Karypis, George, "CLUTO—A Clustering Toolkit", Technical Report, Department of Computer Science and Engineering, University of Minnesota, Apr. 29, 2002, 67 pages.

Kellar, et al., "A Field Study Characterizing Web-Based Information-Seeking Tasks", Journal of the American Society for Information Science and Technology, 58(7):999-1018, Published Mar. 29, 2007, 20 pages.

Kohavi, et al., Controlled experiments on the Web: Survey and practical guide, Data Mining and Knowledge Disc 2009, 42 pages.

Lag Un et al., "ViewSer: A Tool for Large-scale Remote Studies of Web Search Result Examination", CHI 2011, May 7-12, 2011, Vancouver, BC, Canada, 6 pages.

Lagun, et al., "ViewSer: Enabling large-scale remote user studies of Web search examination and interaction", SIGIR, Jul. 24-28, 2011, Beijing, China, 10 pages.

(56) References Cited

OTHER PUBLICATIONS

Liu, et al., "Detecting mouse movement with repeated visit patterns for retrieving noticed knowledge components on web pages", IEICE Trans. Inform. System, vol. E90-D, No. 10, Oct. 2007, 10 pages.
Liu, et al., "Search behaviors in different task types", JCDL, Jun. 21-25, 2010, Gold Coast, Queensland, Australia, 10 pages.
Lorigo, et al., "The Influence of Task and Gender on Search and Evaluation Behavior Using Google", Information Processing and Management 42, 2006, 9 pages.
Mueller, et al., "Cheese: Tracking mouse movement activity on websites, a tool for user modeling", CHI 2001, 2 pages.
Pass, et al., "A picture of search", InfoScale 2006, 7 pages.
Reichle, et al., "E-Z Reader: A Cognitive-control, serial-attention model of eye-movement behavior during reading", Cognitive Systems Research, vol. 7, Issue 1, Mar. 2006, 19 pages.
Rodden, et al., "Exploring how mouse movements relate to eye movements on web search results pages", Workshop on Web Information Seeking and Interaction at SIGIR '07, Jul. 27, 2007, Amsterdam, pp. 29-32.
Shapira, et al., "Study of the usefulness of known and new implicit indicators and their optimal combination for accurate inference of users interests", SAC '06, Apr. 23-27, 2006, Dijon, France, 2 pages.
Teevan, et al., "To Personalize or Not to Personalize: Modeling Queries with Variation in User Intent", In the Proceedings of the 31st International ACM SIGIR Conference on Research and Development in Information Retrieval, Jul. 20, 2008, 8 pages.
Teevan, et al., "Understanding and predicting personal navigation", WSDM, Feb. 9-12, 2011, Hong Kong, China, 10 pages.
Thatcher, A., "Web search strategies: The influence of Web experience and task type", Information Processing and Management 44(2007):1308-1329, 2007, 22 pages.
Torres, et al., "(SMT) Real Time Mouse Tracking Registration and Visualization Tool for Usability Evaluation on Websites.", In the Proceedings of the IADIS International Conference on WWW/Internet, Jan. 2007, 7 pages.
U.S. Appl. No. 13/423,243, Amendment and Response filed Sep. 20, 2013, 12 pages.
U.S. Appl. No. 13/423,243, Amendment and Response filed May 8, 2014, 10 pages.
U.S. Appl. No. 13/423,243, Amendment and Response filed Feb. 23, 2015, 15 pages.
U.S. Appl. No. 13/423,243, Amendment and Response filed Jun. 15, 2015, 14 pages.
U.S. Appl. No. 13/423,243, Amendment and Response filed Mar. 30, 2016, 13 pages.
U.S. Appl. No. 13/423,243, Amendment and Response filed Jul. 14, 2016, 15 pages.
U.S. Appl. No. 13/423,243, Amendment and Response filed Jun. 14, 2017, 22 pages.
U.S. Appl. No. 13/423,243, Office Action dated Jun. 20, 2013, 15 pages.
U.S. Appl. No. 13/423,243, Office Action dated Nov. 8, 2013, 22 pages.
U.S. Appl. No. 13/423,243, Office Action dated Nov. 21, 2014, 19 pages.
U.S. Appl. No. 13/423,243, Office Action dated Mar. 13, 2015, 24 pages.
U.S. Appl. No. 13/423,243, Office Action dated Dec. 30, 2015, 26 pages.
U.S. Appl. No. 13/423,243, Office Action dated Apr. 14, 2016, 28 pages.
U.S. Appl. No. 13/423,243, Office Action dated Feb. 14, 2017, 38 pages.
U.S. Appl. No. 13/423,243, Office Action dated Jul. 11, 2017, 38 pages.
Wang, et al., "PSkip: Estimating Relevance Ranking Quality from Web Search Clickthrough Data", KDD'09, Jun. 28-Jul. 1, 2009, Paris, France, 9 pages.
Ware, et al., "An Evaluation of an Eye Tracker as a Device for Computer Input", . In Proceedings of CHI (1987), 183-188, 6 pages.
Weber, et al., "The Demographics of Web Search", In the Proceedings of the 33rd International ACM SIGIR Conference on Research and Development in Information Retrieval, Jul. 19-23, 2011, 8 pages.
White, et al., "Characterizing the influence of domains expertise on Web search behavior", WSDM, Feb. 9-12, 2009, Barcelona, Spain, 10 pages.
White, et al., "Investigating behavioral variability in Web search", WWW, May 8-12, 2007, Banff, Alberta, Canada, 10 pages.
White, et al., "Investigating the querying and browsing behavior of advanced search engine users", SIGIR, Jul. 23-27, 2007, Amsterdam, The Netherlands, 8 pages.
PCT International Search Report in PCT/US2017/025226, dated May 26, 2017, 16 pages.
Kiseleva et al., "Understanding User Satisfaction with Intelligent Assistants", Proceedings of the 2016 ACM on Conference on Human Information Interaction and Retrieval, CHIIR '16, Mar. 17, 2016, pp. 121-130, New York, USA.
Williams et al., "Detecting Good Abandonment in Mobile Search", World Wide Web, International World Wide Web Conferences Steering Committee, Republic and Canton of Geneva Switzerland, Apr. 11, 2016, pp. 495-505.
Bernstein, et al., "Direct Answers for Search Queries in the Long Tail", In Proceedings of SIGCHI Conference on Human Factors in Computing Systems, May 5, 2012, 10 pages.
Breiman, Leo, "Random Forests", In Journal of Machine Learning, vol. 45, Issue 1, Oct. 2001, 28 pages.
Chen, et al., "Does Vertical Bring more Satisfaction?: Predicting Search Satisfaction in a Heterogeneous Environment", In Proceedings of 24th ACM International on Conference on Information and Knowledge Management, Oct. 19, 2015, 10 pages.
Chilton, et al., "Addressing People's Information Needs Directly in a Web Search Result Page", In Proceedings of 20th International Conference on World Wide Web, Mar. 28, 2011, 10 pages.
Chuklin, et al., "Potential Good Abandonment Prediction", In Proceedings of 21st International Conference on World Wide Web, Apr. 16, 2012, 2 pages.
Chuklin, et al., "Good Abandonments in Factoid Queries", In Proceedings of 21st International Conference on World Wide Web, Apr. 16, 2012. 2 pages.
Diriye, et al., "Leaving So Soon? Understanding and Predicting Web Search Abandonment Rationales", In Proceedings of 21st ACM International Conference on Information and Knowledge Management, Oct. 29, 2012, 10 pages.
Duggan, et al., "Cell Internet Use 2013", In Publication of Pew Research Center, Sep. 16, 2013, 2 pages.
Fan, Wei, "On the Optimality of Probability Estimation by Random Decision Trees", In Proceedings of 19th National Conference on Artificial Intelligence, Jul. 25, 2004, 4 pages.
Fleiss, Joseph L., "Measuring Nominal Scale Agreement among Many Raters", In Journal of Psychological Bulletin, vol. 76, Issue 5, 1971-11, 5 pages.
Fox, et al., "Evaluating Implicit Measures to Improve Web Search", In Journal of ACM Transactions on Information Systems, vol. 23, Issue 2, Apr. 2005, 10 pages.
Guo, et al., "Ready to Buy or Just Browsing? Detecting Web Searcher Goals from Interaction Data", In Proceedings of 33rd International ACM SIGIR Conference on Research and Development in Information Retrieval, Jul. 19, 2010. 8 pages.
Guo, et al., "Beyond Dwell Time: Estimating Document Relevance from Cursor Movements and other Post-click Searcher Behavior", In Proceedings of 21st International Conference on World Wide Web, Apr. 16, 2012. 10 pages.
Guo, et al., "Detecting Success in Mobile Search from Interaction", In Proceedings of 34th International ACM SIGIR Conference on Research and Development in Information Retrieval, Jul. 24, 2011, 2 pages.
Guo, et al., "Predicting Web Search Success with Fine-grained Interaction Data", In Proceedings of 21st ACM International Conference on Information and Knowledge Management, Oct. 29, 2012, 5 pages.

(56) References Cited

OTHER PUBLICATIONS

Guo, et al., "Mining Touch Interaction Data on Mobile Devices to Predict Web Search Result Relevance", In Proceedings of 36th International ACM SIGIR Conference on Research and Development in Information Retrieval, Jul. 28, 2013, 10 pages.
Hassan, Ahmed, "A Semi-Supervised Approach to Modeling Web Search Satisfaction", In Proceedings of 35th International ACM SIGIR Conference on Research and Development in Information Retrieval, Aug. 12, 2012, 10 pages.
Hassan, et al., "Personalized Models of Search Satisfaction", In Proceedings of 22nd ACM International Conference on Information & Knowledge Management, Oct. 27, 2013, 10 pages.
Hassan, et al., "Beyond DCG: User Behavior as a Predictor of a Successful Search", In Proceedings of Third ACM International Conference on Web Search and Data Mining, Feb. 4, 2010, 10 pages.
Hassan, et al., "Beyond Clicks: Query Reformulation as a Predictor of Search Satisfaction", In Proceedings of 22nd ACM International Conference on Information & Knowledge Management, Oct. 27, 2013, 10pages.
Huang, et al., "Web User Interaction Mining from Touch-Enabled Mobile Devices", In Proceedings of Sixth Symposium on Human-Computer Interaction and Information Retrieval, Oct. 4, 2012, 4 pages.
Jiang, et al., "Automatic Online Evaluation of Intelligent Assistants", In Proceedings of 24th International Conference on World Wide Web, May 18, 2015, 11 pages.
Jiang, et al., "Understanding and Predicting Graded Search Satisfaction", In Proceedings of Eighth ACM International Conference on Web Search and Data Mining, Feb. 2, 2015, 10 pages.
Kamvar, et al., "Computers and iPhones and Mobile Phones, oh my!: A Logs-based Comparison of Search Users on Different Devices", In Proceedings of 18th International Conference on World Wide Web, Apr. 20, 2009, 10 pages.
Kelly, Diane, "Methods for Evaluating Interactive Information Retrieval Systems with Users", In Journal of Foundations and Trends in Information Retrieval, vol. 3, Issue 1-2, Apr. 28, 2009, 227 pages.
Kim, et al., "Playing by the Rules: Mining Query Associations to Predict Search Performance", In Proceedings of Sixth ACM International Conference on Web Search and Data Mining, Feb. 4, 2013, 10 pages.
Kim, et al., "Comparing Client and Server Dwell Time Estimates for Click-Level Satisfaction Prediction", In Proceedings of 37th International ACM SIGIR Conference on Research & Development in Information Retrieval, Jul. 6, 2014, 4 pages.
Kim, et al., "Modeling Dwell Time to Predict Click-level Satisfaction", In Proceedings of 7th ACM International Conference on Web Search and Data Mining, Feb. 24, 2014, 10 pages.
Lagun, et al., "Towards Better Measurement of Attention and Satisfaction in Mobile Search", In Proceedings of 37th International ACM SIGIR Conference on Research & Development in Information Retrieval, Jul. 6, 2014, 10 pages.
Landis, et al., "The Measurement of Observer Agreement for Categorical Data", In Journal of Biometrics, vol. 33, No. 1, Mar. 1977, 17 pages.
Li, et al. "Good Abandonment in Mobile and PC Internet Search", In Proceedings of 32nd International ACM SIGIR Conference on Research and Development in Information Retrieval, Jul. 19, 2009, 8 pages.
Liao, et al., "Evaluating the Effectiveness of Search Task Trails", In Proceedings of 21st International Conference on World Wide Web, Apr. 16, 2012, 10 pages.
Liu, et al., "Different Users, Different Opinions: Predicting Search Satisfaction with Mouse Movement Information", In Proceedings of 38th International ACM SIGIR Conference on Research and Development in Information Retrieval, Aug. 9, 2015, 10 pages.
Song, et al. "Context-Aware Web Search Abandonment Prediction", In Proceedings of 37th International ACM SIGIR Conference on Research & Development in Information Retrieval, Jul. 6, 2014, 10 pages.
Stamou, et al., "Interpreting User Inactivity on Search Results", In Proceedings of 32nd European Conference on Information Retrieval, Mar. 28, 2010, 12 pages.
White, et al., "Questions vs. Queries in Informational Search Tasks", In Proceedings of 24th International Conference on World Wide Web, May, 18, 2015, 2 pages.
Thuma, et al., "Evaluating Bad Query Abandonment in an Iterative SMS-Based FAQ Retrieval System", In Proceedings of the 10th Conference on Open Research Areas in Information Retrieval, May 22, 2013, 4 pages.
Maxwell, et al., "Searching and Stopping: An Analysis of Stopping Rules and Strategies", In Proceedings of the 24th ACM International on Conference on Information and Knowledge Management, Oct. 17, 2015, 10 pages.
Wu, et al., "Online search stopping behaviors: An investigation of query abandonment and task stopping", In Proceedings of the American Society for Information Science and Technology, vol. 51, Issue 1, Oct. 31, 2014, 1 page.

* cited by examiner

IDENTIFYING ABANDONMENT USING GESTURE MOVEMENT

CROSS-REFERENCE TO RELATED APPLICATIONS

This application claims priority from provisional U.S. Application Ser. No. 62/320,201, filed Apr. 8, 2016, entitled "IDENTIFYING ABANDONMENT USING GESTURE MOVEMENT," which application is incorporated herein by reference in its entirety.

BACKGROUND

Query abandonment occurs when a user that has submitted a query to a search utility (e.g., a search engine, a task completion engine, etc.) does not click on a search result within a received result set and does not attempt to refine the query. Generally, abandoned queries are considered to reflect user dissatisfaction (e.g., "bad" abandonment) with the search result. As a result, many approaches for measuring the effectiveness of search engines do not incorporate query abandonment data. Instead, such approaches have been based on implicit feedback signals, such as user clicks and click-related dwell time. However, these approaches are not appropriate when "good" abandonment has occurred.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

This summary is provided to introduce a selection of concepts in a simplified form that are further described below in the Detail Description section. This summary is not intended to identify key features or essential features of the claimed subject matter, nor is it intended to be used as an aid in determining the scope of the claimed subject matter.

Examples of the present disclosure describe systems and methods of identifying good and bad abandonment using gesture movement. In aspects, user feedback signals may be received by a client device in response to the viewing and/or navigation of query results. The feedback signals may be provided to a framework for determining and/or analyzing query abandonment. The framework may identify gesture data in the feedback signals and extract feature data from the gesture data. The feature data may be provided to a metrics component to determine metrics and/or satisfaction values for the feature data. The metrics and/or feature data may be used to train a predictive model to identify good abandonment in query results.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
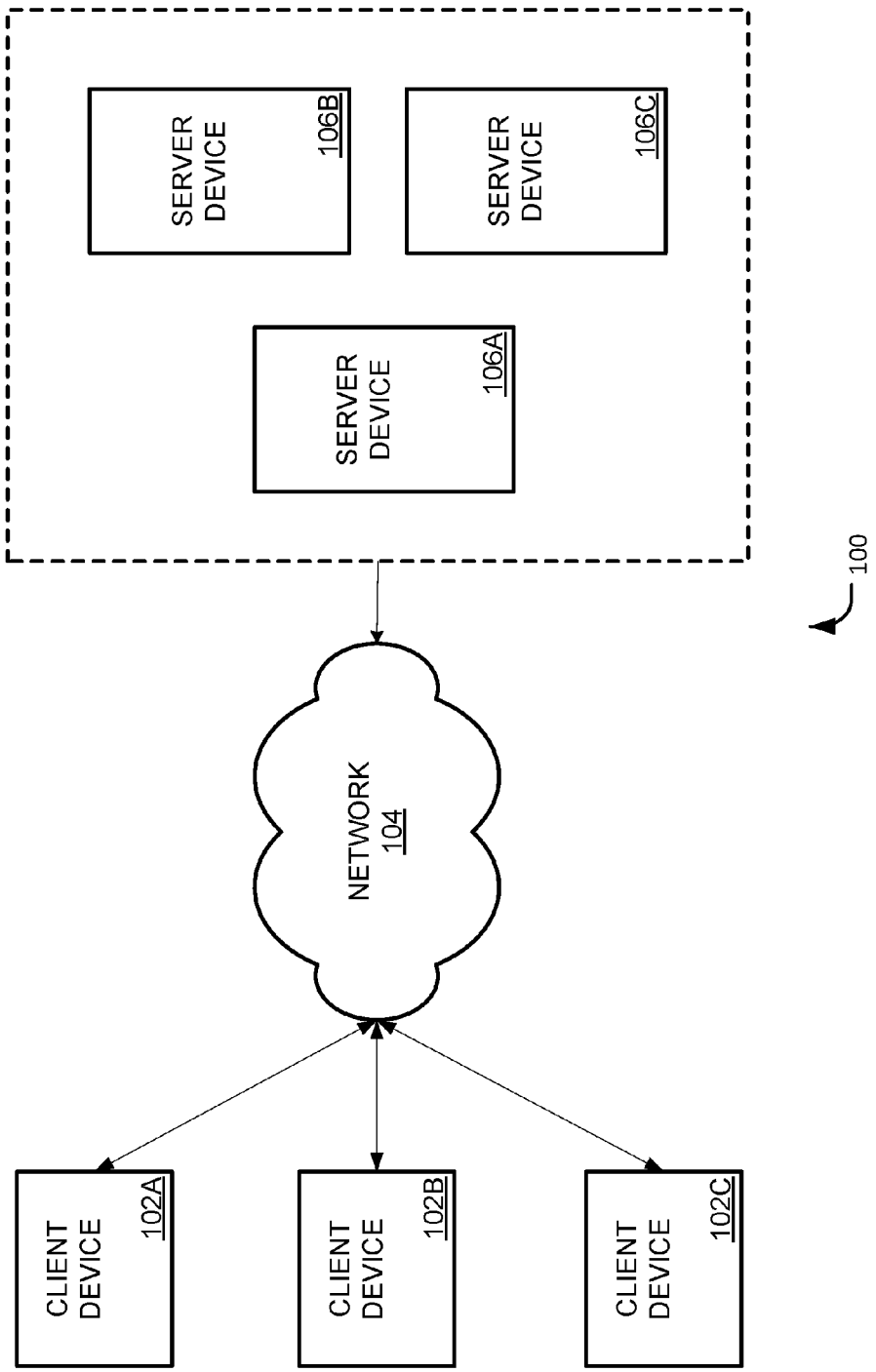
FIG. 1 illustrates an overview of an example system for identifying good and bad abandonment using gesture movement as described herein.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure provides systems and methods of identifying good and bad abandonment using gesture movement. In aspects, a client device may provide query results (e.g., a search engine result page (SERP), a file system result set, a document search result set, etc.) in response to receiving a query. In examples, an SERP may comprise elements, such as a search result title, search result description or snippet, an image, a link and a direct answer/response. In some aspects, the prevalence and/or ordering of the SERP elements may correspond to the type of client device used. For example, a mobile client device may prioritize a direct answer/response over a list of webpage links due at least in part to the reduced size of the mobile device's screen (compared to, for example, a PC monitor). The client device may receive user feedback signals in response to the viewing and/or navigation of the query results. User feedback signals, as used herein, may refer to gestures (e.g., swipes, clicks, post-click activity (e.g., scrolls, cursor movement, etc.)) dwell time, session duration, query (re)formulation statistics, element visibility, etc. The term gesture, as used herein, may refer to touch-based actions (such as swipe data), reading-based actions and associated data. Swipe data, as used herein, may refer to coordinate data, trajectory data/patterns and/or occlusion events associated with swipes across a display area, such as a viewport. A viewport, as used herein, may refer to the viewing region of a display screen.

In some aspects, the user feedback signals may be provided to a framework for determining and/or analyzing query abandonment. Query abandonment, as used herein, may refer to when a query result is not clicked and there is no attempt to refine the query that resulted in the query result. In examples, query abandonment may be designated as "good" or "bad." Good abandonment, as used herein, may refer to an abandoned query for which a query was satisfied by the query results. Bad abandonment, as used herein, may refer to an abandoned query for which a query was unsatisfied by the query results. Satisfaction value, as used herein, may refer to the extent to which a user's goal or intent is fulfilled. Satisfaction may be influenced by the relevance of search results, time taken to find search results, effort spent, the query, etc. The framework may identify gesture data in the feedback signals and extract feature data from the gesture data. In examples, extracting feature data may include identifying feature categories for gesture, query and session information and constructing features based thereon.

In some aspects, the extracted feature data may be provided to a metrics component. The metrics component may be used to determine metrics and/or satisfaction values for the feature data. In examples, a satisfaction value may be provided by a user (e.g., an expert, a qualified user, etc.) or determined using, for example, an algorithm or trained model. A model, as used herein, may refer to a statistical language model that may be used to determine a probability distribution over one or more word and/or character sequences and/or to predict a response value from one or more predictors. In examples, a model may be a rule-based model, a machine-learned regressor, a machine-learned classifier, or the like. In aspects, metrics, satisfaction values and/or feature data may be used to train a model to identify good abandonment in query results. Training a model, as used herein, may refer to using, for example, a set of data (e.g., training set data, test data, validation set data, etc.) to teach a model to find and/or describe predictive relationships. The trained model may then be used to identify and/or determine good abandonment in received input.

Accordingly, the present disclosure provides a plurality of technical benefits including but not limited to: analyzing gesture data from mobile devices; improving the detection of abandonment queries; determining good and bad abandonment queries; generating features using gesture data; using features to determine user satisfaction and user dissatisfaction; generating abandonment metric data using features; training predictive models using gesture data and/or metric data; improving the generation and/or presentation of content in search results; improving user experience; a reduction in network traffic due to the generation of better query results; and improving efficiency and quality for applications/services utilizing examples of the present disclosure, among other examples.

FIG. 1 illustrates an overview of an example system for identifying good and bad abandonment using gesture movement as described herein. Exemplary system 100 presented is a combination of interdependent components that interact to form an integrated whole for personalizing natural language systems. Components of the systems may be hardware components or software implemented on and/or executed by hardware components of the systems. In examples, system 100 may include any of hardware components (e.g., used to execute/run operating system (OS)), and software components (e.g., applications, application programming interfaces (APIs), modules, virtual machines, runtime libraries, etc.) running on hardware. In one example, an exemplary system 100 may provide an environment for software components to run, obey constraints set for operating, and utilize resources or facilities of the system 100, where components may be software (e.g., application, program, module, etc.) running on one or more processing devices. For instance, software (e.g., applications, operational instructions, modules, etc.) may be run on a processing device such as a computer, mobile device (e.g., smartphone/phone, tablet, laptop, personal digital assistant (PDA), etc.) and/or any other electronic devices. As an example of a processing device operating environment, refer to the exemplary operating environments depicted in FIGS. 4-7. In other examples, the components of systems disclosed herein may be spread across multiple devices. For instance, input may be entered on a client device and information may be processed or accessed from other devices in a network, such as one or more server devices.

As one example, the system 100 comprises client device 102A, client device 102B, client device 102C, distributed network 104, and a distributed server environment comprising one or more servers such as server device 106A, server device 106B and server device 106C. One of skill in the art will appreciate that the scale of systems such as system 100 may vary and may include more or fewer components than those described in FIG. 1. In some examples, interfacing between components of the system 100 may occur remotely, for example, where components of system 100 may be spread across one or more devices of a distributed network.

In aspects, client device 102A may be configured to receive input from user via a user interface component or other input means. Examples of input may include voice, visual, touch and text input. The received input may be stored on the client device or in a data store accessible to the client device. Client devices 102B and 102C may be similarly configured to client device 102A, but may be a different device type from client device 102A. For example, input may be collected from a user performing a mobile search query using client device 102A (e.g., a mobile phone), client device 102B (e.g., a tablet) and/or client device 102C (e.g., a PDA). The received input for the user may be stored in a data store accessible to client devices 102A-C. In another example, each of client devices 102A-C may receive input from separate users. Client device 102A-C may further be configured to transmit the input to a server device, such as server device 106A, via distributed network 104.

Server devices 106A-C may be configured to receive and process input from one or more client device. In aspects, processing the input may include storing the input in a data store accessible to the server device and parsing the input to identify at least gesture-based data. The gesture-based data may comprise at least touch-based data and reading-based data, such as swipe data, click data, post-click data, dwell time, session statistics, query formulation data, element/object visibility, etc. The gesture-based data may be matched or associated to one or more corresponding users, tasks and/or query. The gesture-based data may be used to determine good and/or bad query abandonment. Server devices 106A-C may further be configured to extract features from the gesture-based data. In examples, the features may be separated into categories, such as viewport features, first visible answer features, aggregate answer features, aggregate organic search result features, focus features, and query session features. The features may be used to manually and/or automatically determine metrics for one or more features. The features may also be used to determine satisfaction/dissatisfaction with a query or one or more SERP elements. Server devices 106A-C may further be configured to train a model or build a rule set for identifying and/or determining good abandonment. In at least one example, features and/or metric data may be provided as input to the model.

Figure 2:
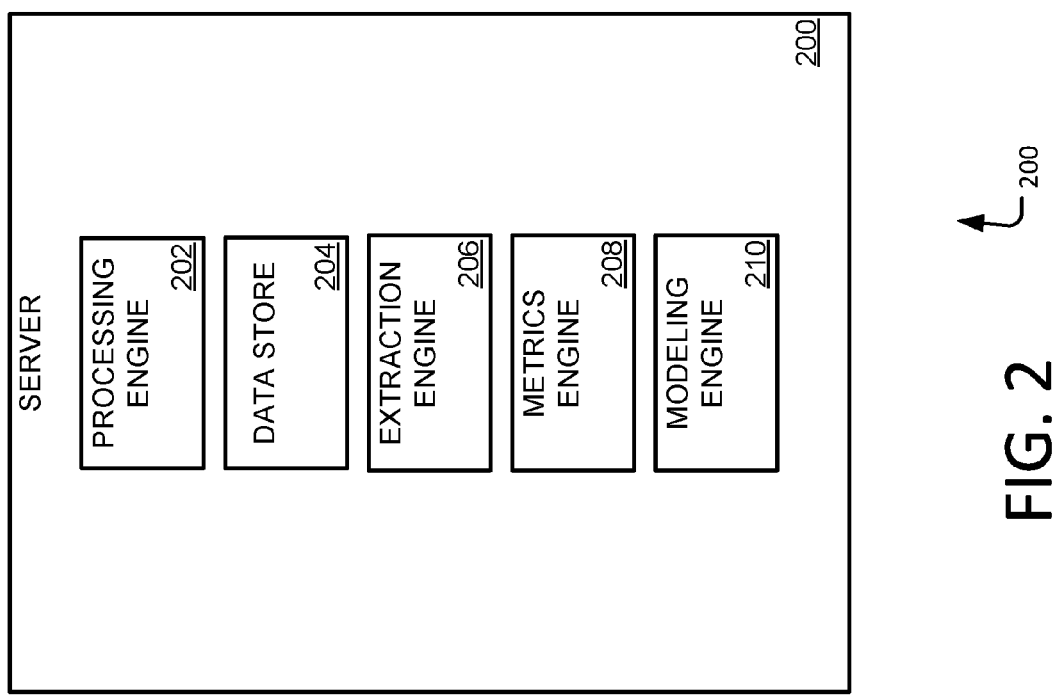
FIG. 2 illustrates an exemplary input processing unit for identifying good and bad abandonment using gesture movement as described herein.

FIG. 2 illustrates an overview of an exemplary input processing unit 200 for identifying good and bad abandonment using gesture movement, as described herein. The abandonment identification techniques implemented by input processing unit 200 may comprise the abandonment identification techniques and input described in FIG. 1. In alternative examples, a single system (comprising one or more components such as processor and/or memory) may perform processing described in systems 100 and 200, respectively. Further, input processing unit 200 may comprise a user interface component as described in the description of FIG. 1.

With respect to FIG. 2, input processing unit 200 may comprise processing engine 202, data store 204, extraction engine 206, metrics engine 208 and model 210. Processing engine 202 may be configured to receive and process received input. In aspects, processing engine 202 may parse received input to identify gesture data and corresponding tasks and/or query. In at least one example, the identification process may include the use of pattern-matching techniques, a rule set, fuzzy logic, machine-learned models and/or one or more weighting algorithms. Processing engine 202 may use the parsed gesture data and/or corresponding queries to determine and/or classify abandoned queries. For example, processing engine 202 may determine that a user task is associated with three queries. The determination may include using, for example, a task identifier, a timestamp, a resource identifier, a task/query termination indicator and/or placement within a list. Processing engine 202 may identify the third of the three queries as an abandoned query and/or classify the query as good abandonment by determining the query is the final query in the sequence of queries. In another example, the parsed data may represent a pre-labeled dataset. For example, the input may comprise a test dataset for which abandonment determination, satisfaction labels and/or other metrics have been determined by one or more users (e.g., experts, judges, etc.). In such an example, processing engine 202 may identify a label associated with a query to classify an abandoned query. In some examples, processing engine 202 may store the received input and/or parsed data in a data store, such as data store 204. Data store 204 may be configured to store the information according to, for example, user identification, originating application, query type, etc.

Extraction engine 206 may be configured to extract features from abandoned queries. In aspects, extraction engine 206 may receive or access the data processed by processing engine 202. In examples, the processed data may be used to generate feature data corresponding to one or more features or feature categories, such as gesture features and/or query and session features. In some examples, the feature data may comprise, for example, viewport feature data comprising gesture data; first answer feature data for the highest ranked visible search result answer; aggregate answer feature data based on the set of visible search result answers; aggregate organic result feature data based on external search result answers, time to focus feature data for element visibility information; and query/session feature data for user session information. In some aspects, the features and/or feature categories may be predefined. In other aspects, the processed data may be used to identify, determine and/or generate one or more features or feature categories. For example, extraction engine 206 may identify and/or group like or similar feature data in the processed data. The identified feature data may then be used to generate features and/or coarse or generic feature categories corresponding to the respective features. In aspects, generating feature data and determining features and/or feature categories may include using, for example, pattern-matching techniques, a rule set, machine-learned models, etc.

Metrics engine 208 may be configured to determine metrics for one or more features. In aspects, metrics engine 208 may use the feature data associated with a feature or feature category as input to determine metrics and/or scores for one or more features in the category. The metrics may be based on, for example, the number of gestures (e.g., number of swipes, number of swipes per SERP element, etc.), the gesture direction information (e.g., number of down swipes, swipe direction changes, etc.) or the element duration events (e.g., time per visible SERP element, attributed reading time, etc.) associated with one or more types of query abandonment (e.g., good, bad, unknown). Based on the metrics, the metrics engine 208 may generate a value correlated to (or indicative of) satisfaction with the corresponding metric, feature and/or query result. In examples, the value may be generated using an algorithm or statistical model, such as the Pearson product-moment correlation coefficient (PCC). The PCC, as used herein, refers to a measure of the linear correlation between two variables, giving a value between +1 and −1 inclusive, where 1 is total positive correlation, 0 is no correlation, and −1 is total negative correlation. In other aspects, metrics engine 208 may comprise an interface for receiving metrics from a user. The interface may allow a user to manually add and/or modify metrics. For example, an administrator of input processing unit 200 may modify the metrics to mitigate data corruption, reflect changes in technology or usage, isolate model-specific data, etc. In at least one aspect, the metrics/values may be stored in, for example, data store 204.

Model engine 210 may be configured to generate and/or train one or more models. In aspects, model engine 210 may receive and use feature data, metrics and/or portions of received input to train one or more query abandonment models. For example, model engine 210 may use the gesture-based features described above to train a gesture-based model. The gesture-based model may be used to analyze and/or determine the usefulness of a user's physical behavior and gestures in detecting good abandonment. In another example, model engine 210 may use the gesture-based features and the query/session features described above to train a user interaction model. The user interaction model may be used to analyze and/or determine the usefulness of a user's physical behavior, gestures, click data, query (re)formulation and session data in detecting good abandonment. For instance, model engine 210 may determine that high numbers of reformulated queries and low SERP element dwell times in a user session are negatively correlated with user satisfaction. In some aspects, the models generated by model engine 210 may be provided input received by input processing unit 200. As described above, the input may comprise at least gesture data associated with a mobile search query. The generated models may process the received input and produce an output comprising, for example, an abandonment determination and/or statistical values associated with the received input.

Model engine 210 may further be configured to collect input supplied to a model and/or output received from the model to generate model-dependent satisfaction metrics. For example, model engine 210 may train a plurality of models, such as gesture-based model and a user interaction model as described above. Each of the models may be provided a dataset as input. In at least one example, the datasets provided to the models may be identical or substantially similar. Each of the models may produce output based on the dataset used as input. Model engine 210 may provide the outputs to metrics engine 208. In turn, metrics engine 208 may generate a set of satisfaction metrics for each of the models. The satisfaction metrics may include features, satisfaction scores/values (as described above), statistically significant data, etc. In some aspects, the sets of satisfaction metrics may be stored independently to preserve model-dependent metrics. The independent metrics may then be compared to each other or to the metrics of other models to determine result accuracy and/or to modify, for example, satisfaction (or dissatisfaction) values for particular features. In a particular aspect, the satisfaction metrics may also be used to determine and/or rank the search result elements that are indicative of various types of abandonment.

Figure 3:
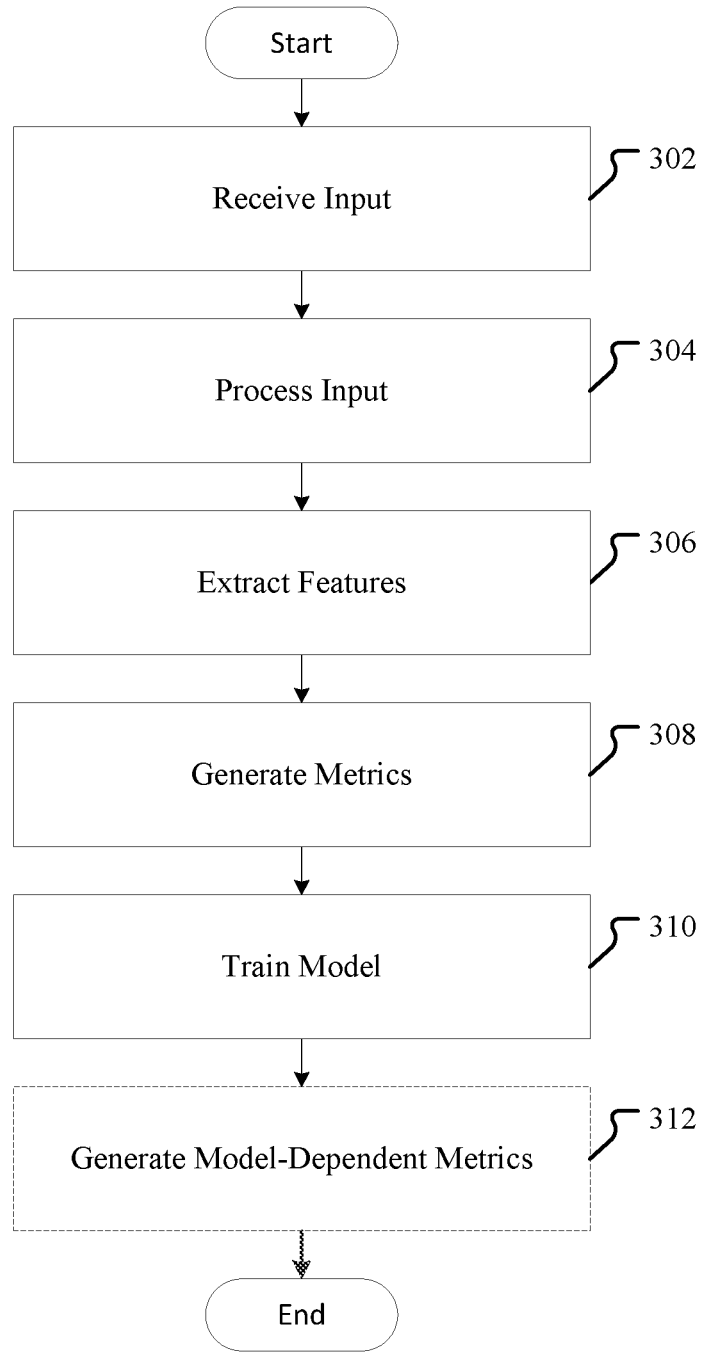
FIG. 3 illustrates an example method of determining good and bad abandonment using gesture movement as described herein.

FIG. 3 illustrates an example method of identifying good and bad abandonment using gesture movement as described herein. In aspects, method 300 may be executed by an exemplary system such as system 100 of FIG. 1. In examples, method 300 may be executed on a device comprising at least one processor configured to store and execute operations, programs or instructions. However, method 300 is not limited to such examples. In other examples, method 300 may be performed on an application or service for providing query resolution. In at least one example, method 300 may be executed (e.g., computer-implemented operations) by one or more components of a distributed network, such as a web service/distributed network service (e.g. cloud service).

Exemplary method 300 begins at operation 302 where input may be received by a computing device, such as input processing unit 200. In aspects, the computing device may receive input from a client device, such as client devices 102A-C, via a service or an interface exposed by the computing device. In other aspects, the computing device may receive input directly from a user via an interface. The input may represent search query data and corresponding user input for a search executed on a client device. The computing device may store the input in a data store accessible to the computing device. In at least one example, the input may be stored by user identification, client device, client device type, application and/or timestamp.

At operation 304, the input may be processed. In aspects, the input may be accessed by a processing component, such as processing engine 202. Processing the input may include parsing the input to identify types of user input and corresponding tasks. For example, the processing component may determine that input comprises gesture data (e.g., swipe data, visibility data, etc.), non-gesture data (e.g., click data, click-based dwell data, etc.) and tasks (e.g., queries, user intents, query features, etc.). In at least one example, the processing component may also determine that the input types are associated with particular device types. For instance, the gesture data may be primarily (or exclusively) associated with mobile devices and the non-gesture data may be primarily (or exclusively) associated with non-mobile devices, such as PCs. The processing component may label (or otherwise designate) the input accordingly and/or separate the input into one or more groups. In some aspects, the processing component may use the input to identify and/or classify abandoned queries. Identifying and/or classifying the abandoned queries may include identifying each query in a task, ordering the queries (e.g., chronologically, according to query identifier, etc.), and determining the query that satisfied the task and/or user intent. In one example, determining the query that satisfied the task and/or user intent may include selecting the final (e.g., last) query of a task. In another example, determining the query may include using an algorithm or model to analyze query features, such as whether the query was reformulated, the time between queries, a modification of user intent, etc. For instance, a random forest classifier may detect that a query result satisfied a task, yet a user continued to submit queries; thereby, indicating the initiation of a separate task, answer validation or unrelated web browsing. A random forest classifier, as used herein, may refer to an ensemble classifier comprising a set of decision trees, where each tree is built with a bootstrap sample from the dataset. In examples, determining a split in the decision tree may be based on a random subset of query features. In some aspects, the processing component may associate the abandoned queries with the corresponding gesture and/or non-gesture data.

At operation 306, features may be extracted from the input. In aspects, a feature extracting component, such as extraction engine 206, may access the input processed by the processing component. In some examples, the extracting component may analyze the processed input to determine one or more features in the input. The extracting component may then cluster the features into coarse or generic groups using calculations or algorithms, such as the k-means clustering algorithm. k-means clustering, as used herein, may refer to an operation of vector quantization that is used in cluster analysis to partition n observations into k clusters in which each observation belongs to the cluster with the nearest mean. The features may then be assigned or otherwise associated to the corresponding feature group. In other examples, the features and/or feature groups may be predetermined. For example, the gesture, query and session data may be organized in corresponding categories, such that each category comprises one or more features corresponding to the category. In such an example, features known (or hypothesized) to be particularly relevant to abandonment determination may be used. For instance, the gesture feature group may comprise features associated with viewport viewing and manipulation (e.g., swipe volume, swipe direction, etc.), first answer statistics (e.g., visibility duration, percentage visible, etc.), aggregate answer statistics (e.g., visibility duration, attributed reading time, etc.), aggregate organic result statistics (e.g., visibility duration, percentage visible, etc.), time to focus statistics (e.g., time to focus on an answer, SERP element, etc.). The query and/or session group may comprise features associated with query statistics (e.g., number of queries formulated, query length, etc.) and session statistics (e.g., session duration, click count, query index within session, etc.)

At operation 308, metrics may be generated from the input. In aspects, the features generated by the feature extracting component may be accessed by a metrics generation component, such as metrics engine 208. In some examples, the metrics generation component may generate metrics for one or more of the features using calculations or algorithms, such as the Pearson product-moment correlation coefficient (PCC). The metrics may indicate a determined correlation between the features and good abandonment, bad abandonment, user satisfaction and/or user dissatisfaction. In at least one example, the metrics generation component may calculate and record statistically significant correlations between the features and satisfaction. In another example, a user may determine and/or input the metrics via an interface provided by the computing device. The metrics may indicate a perceived or theoretical correlation between the features and user (dis)satisfaction. For example, the metrics may be assigned according to a determination that data related to swipes (such as total number of swipes, number of down swipes, distance swiped, etc.) are negatively correlated with satisfaction, whereas data related to reading and visibility (such as time to focus on an answer, attributed reading time per pixel, etc.) are positively correlated with satisfaction.

At operation 310, a model may be trained. In aspects, a model training component, such as model engine 210, may train one or more models using the metrics data generated by the metrics generation component. For example, the model training component may train a model using the gesture features and corresponding metrics data. The resulting model may be a supervised classifier used to analyze and/or determine the usefulness of a user's physical behavior and gestures in detecting satisfaction, dissatisfaction, good abandonment and/or bad abandonment. In another example, the model training component may train a model using the gesture features, query features, session features and corresponding metrics data. The resulting gesture model may be used to analyze and/or determine the usefulness of a user's physical behavior, gestures, click data, query (re)formulation and session data in detecting good abandonment. In some aspects, the model training component may train and compare a plurality of models. For example, the model training component may train a model using the gesture features and corresponding metrics data (e.g., a gesture model), a model using query features, session features and corresponding metrics data (e.g., a query/session model), and a model using gesture features, query features, session features and corresponding metrics data (e.g., a gesture/query/session model) model.

At optional operation 312, model-dependent satisfaction metrics may be generated. In aspects, a set of input data may be provided to one or more models trained by the model training component. Each of the models may produce output based on the set of input data. For example, the output may comprise an abandonment determination (e.g., good, bad, unknown) and/or user satisfaction data for a set of search results. The input processing unit may then present the output to the requesting client device via one or more interfaces. In some aspects, the model training component may collect the input to and/or output from one or more models. The model training component may organize the collected model data into datasets corresponding to respective models and provide the datasets to the metrics generation component. The metrics generation component may generate a set of satisfaction metrics corresponding to each of the models using the respective datasets. In at least one example, the set of satisfaction metrics may describe user behavior and/or user intent at a task level. In another example, the set of satisfaction metrics may describe user behavior and/or user intent at a query level. The sets of satisfaction metrics may be stored separately or stored such that each set of satisfaction metrics for a model may be updated without needing to update the set of satisfaction metrics for the other models. In some aspects, one or more sets of satisfaction metrics may be compared to rank or otherwise determine the accuracy and/or quality of the respective models. Based on this comparison, one or more features or values of the feature data may be modified, search result elements and/or presentation formats may be ranked or modified, and models may be trained or otherwise modified.

FIGS. 4-7 and the associated descriptions provide a discussion of a variety of operating environments in which aspects of the disclosure may be practiced. However, the devices and systems illustrated and discussed with respect to FIGS. 4-7 are for purposes of example and illustration and are not limiting of a vast number of computing device configurations that may be utilized for practicing aspects of the disclosure, described herein.

Figure 4:
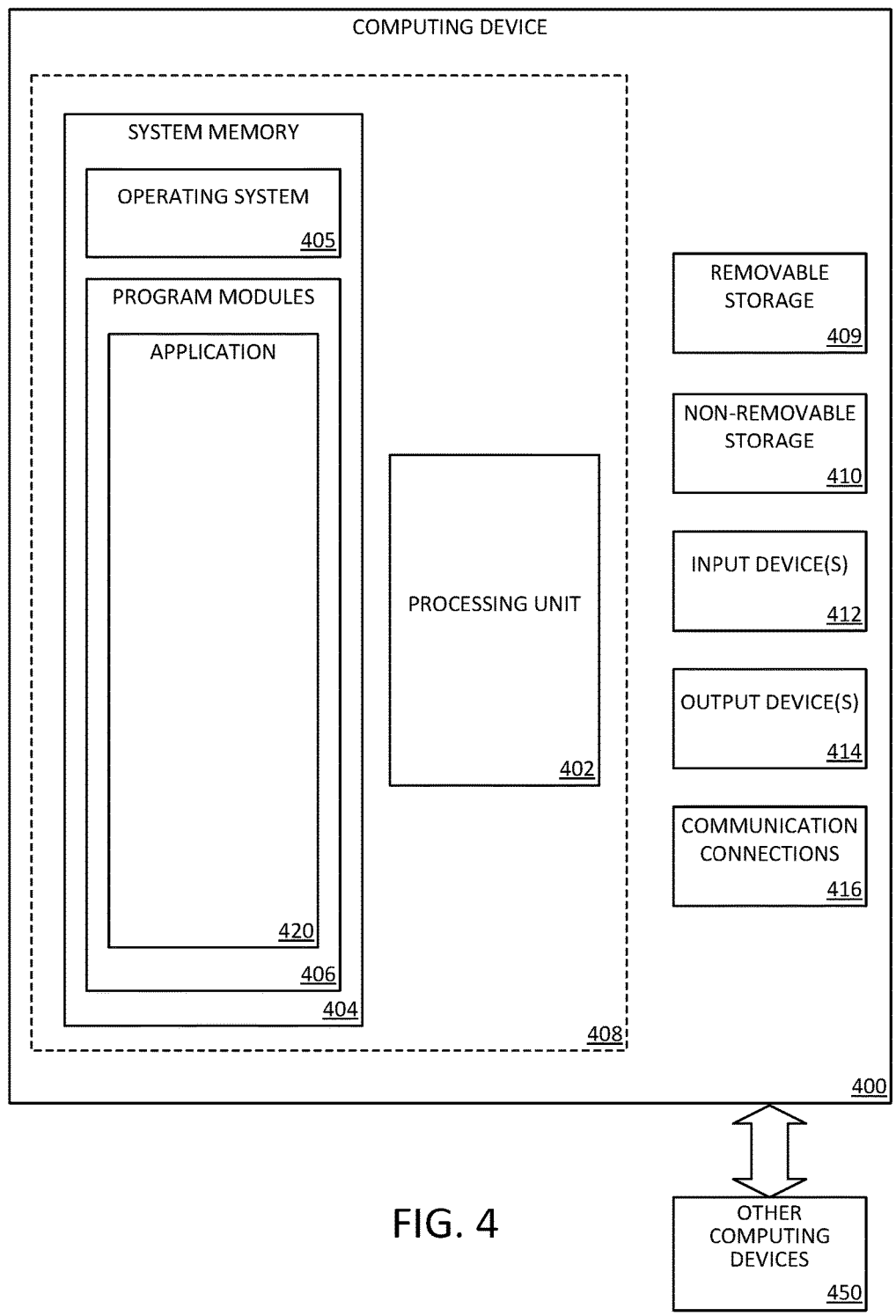
FIG. 4 is a block diagram illustrating example physical components of a computing device with which aspects of the disclosure may be practiced.

FIG. 4 is a block diagram illustrating physical components (e.g., hardware) of a computing device 400 with which aspects of the disclosure may be practiced. The computing device components described below may be suitable for the computing devices described above, including the client computing devices 102A-C and the server computing devices 106A-C. In a basic configuration, the computing device 400 may include at least one processing unit 402 and a system memory 404. Depending on the configuration and type of computing device, the system memory 404 may comprise, but is not limited to, volatile storage (e.g., random access memory), non-volatile storage (e.g., read-only memory), flash memory, or any combination of such memories. The system memory 404 may include an operating system 405 and one or more program modules 406 suitable for running software application 420, such as one or more components supported by the systems described herein. The operating system 405, for example, may be suitable for controlling the operation of the computing device 400. Furthermore, embodiments of the disclosure may be practiced in conjunction with a graphics library, other operating systems, or any other application program and is not limited to any particular application or system. This basic configuration is illustrated in FIG. 4 by those components within a dashed line 408. The computing device 400 may have additional features or functionality. For example, the computing device 400 may also include additional data storage devices (removable and/or non-removable) such as, for example, magnetic disks, optical disks, or tape. Such additional storage is illustrated in FIG. 4 by a removable storage device 409 and a non-removable storage device 410.

As stated above, a number of program modules and data files may be stored in the system memory 404. While executing on the processing unit 402, the program modules 406 (e.g., application 420) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 400 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 400 may also have one or more input device(s) 412 such as a keyboard, a mouse, a pen, a sound or voice input device, a touch or swipe input device, etc. The output device(s) 414 such as a display, speakers, a printer, etc. may also be included. The aforementioned devices are examples and others may be used. The computing device 400 may include one or more communication connections 416 allowing communications with other computing devices 450. Examples of suitable communication connections 416 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 5A:
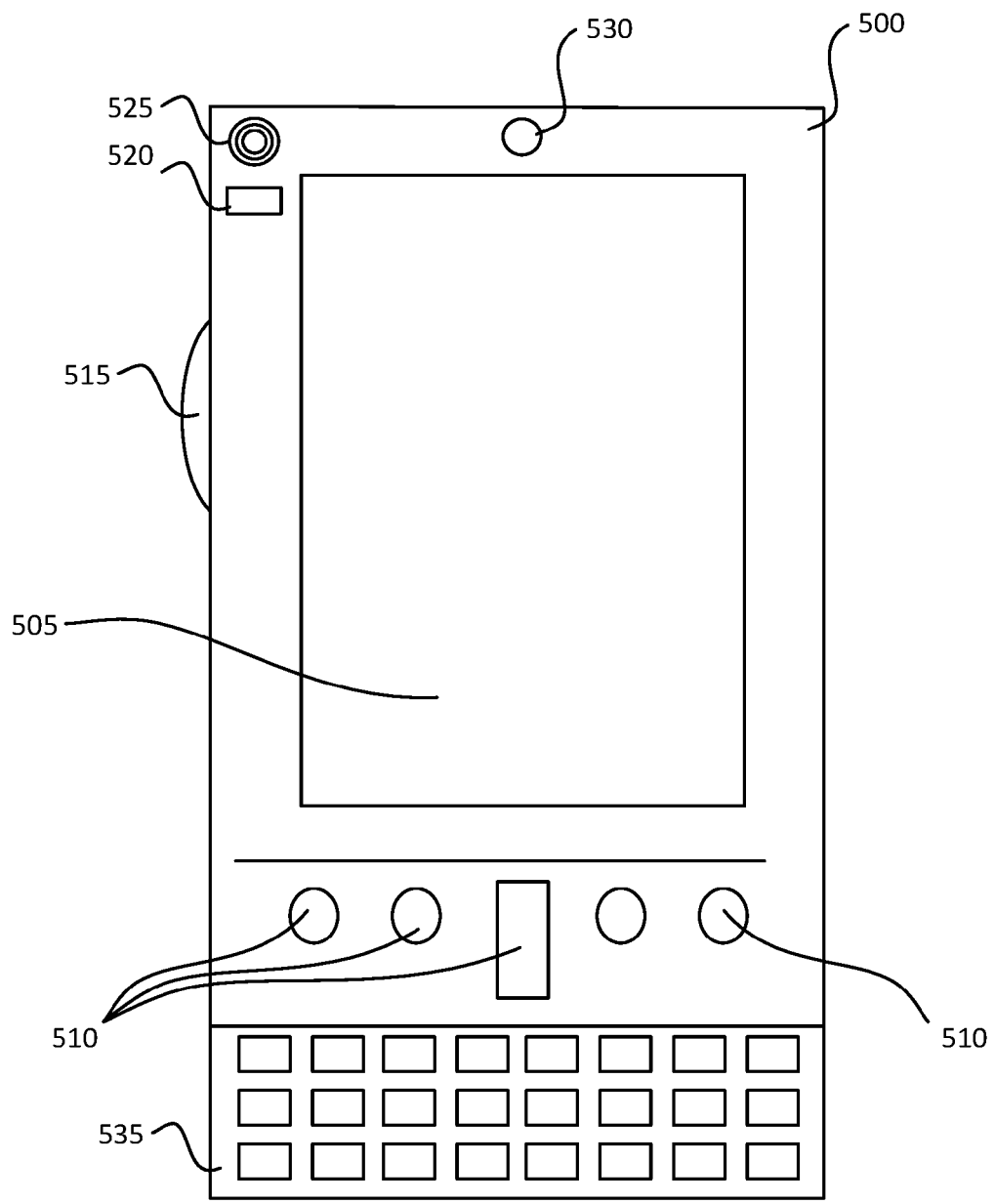
FIG. 5A and 5B are simplified block diagrams of a mobile computing device with which aspects of the present disclosure may be practiced.
Figure 5B:
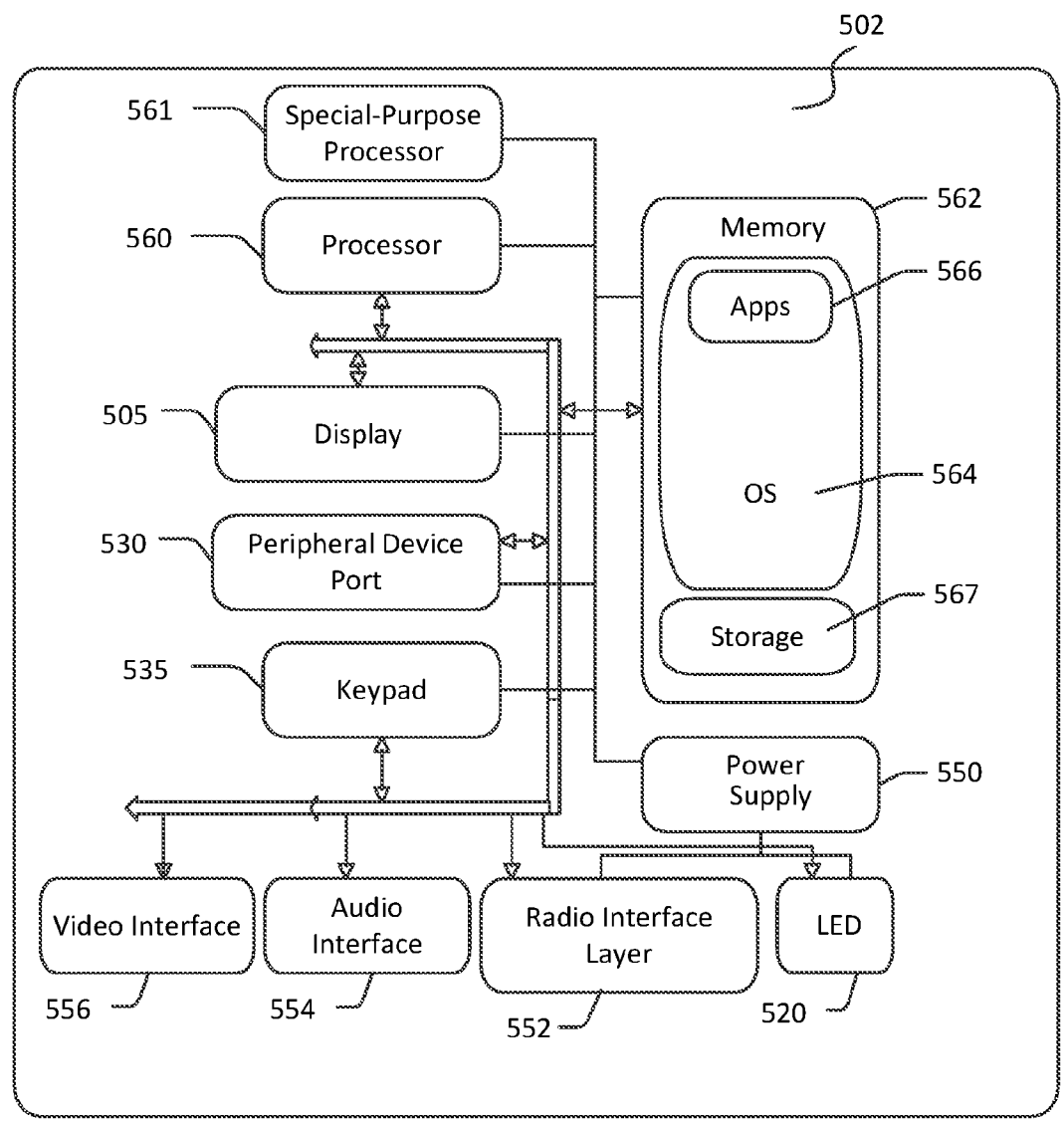

FIGS. 5A and 5B illustrate a mobile computing device 500, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 5A, one aspect of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., a touch screen display). If included, an optional side input element 515 allows further user input. The side input element 515 may be a rotary switch, a button, or any other type of manual input element. In alternative aspects, mobile computing device 500 may incorporate more or less input elements. For example, the display 505 may not be a touch screen in some embodiments. In yet another alternative embodiment, the mobile computing device 500 is a portable phone system, such as a cellular phone. The mobile computing device 500 may also include an optional keypad 535. Optional keypad 535 may be a physical keypad or a "soft" keypad generated on the touch screen display. In various embodiments, the output elements include the display 505 for showing a graphical user interface (GUI), a visual indicator 520 (e.g., a light emitting diode), and/or an audio transducer 525 (e.g., a speaker). In some aspects, the mobile computing device 500 incorporates a vibration transducer for providing the user with tactile feedback. In yet another aspect, the mobile computing device 500 incorporates input and/or output ports, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one aspect of a mobile computing device. That is, the mobile computing device 500 can incorporate a system (e.g., an architecture) 502 to implement some aspects. In one embodiment, the system 502 is implemented as a "smart phone" capable of running one or more applications (e.g., browser, e-mail, calendaring, contact managers, messaging clients, games, and media clients/players). In some aspects, the system 502 is integrated as a computing device, such as an integrated personal digital assistant (PDA) and wireless phone.

One or more application programs 566 may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. The system 502 also includes a non-volatile storage area 568 within the memory 562. The non-volatile storage area 568 may be used to store persistent information that should not be lost if the system 502 is powered down. The application programs 566 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500 described herein (e.g., search engine, extractor module, relevancy ranking module, answer scoring module, etc.).

The system 502 has a power supply 570, which may be implemented as one or more batteries. The power supply 570 might further include an external power source, such as an AC adapter or a powered docking cradle that supplements or recharges the batteries.

The system 502 may also include a radio interface layer 572 that performs the function of transmitting and receiving radio frequency communications. The radio interface layer 572 facilitates wireless connectivity between the system 502 and the "outside world," via a communications carrier or service provider. Transmissions to and from the radio interface layer 572 are conducted under control of the operating system 564. In other words, communications received by the radio interface layer 572 may be disseminated to the application programs 566 via the operating system 564, and vice versa.

The visual indicator 520 may be used to provide visual notifications, and/or an audio interface 574 may be used for producing audible notifications via the audio transducer 525. In the illustrated embodiment, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. In accordance with embodiments of the present disclosure, the microphone may also serve as an audio sensor to facilitate control of notifications, as will be described below. The system 502 may further include a video interface 576 that enables an operation of an on-board camera 530 to record still images, video stream, and the like.

A mobile computing device 500 implementing the system 502 may have additional features or functionality. For example, the mobile computing device 500 may also include additional data storage devices (removable and/or non-removable) such as, magnetic disks, optical disks, or tape. Such additional storage is illustrated in FIG. 5B by the non-volatile storage area 568.

Data/information generated or captured by the mobile computing device 500 and stored via the system 502 may be stored locally on the mobile computing device 500, as described above, or the data may be stored on any number of storage media that may be accessed by the device via the radio interface layer 572 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio interface layer 572 or via a distributed computing network. Similarly, such data/information may be readily transferred between computing devices for storage and use according to well-known data/information transfer and storage means, including electronic mail and collaborative data/information sharing systems.

Figure 6:
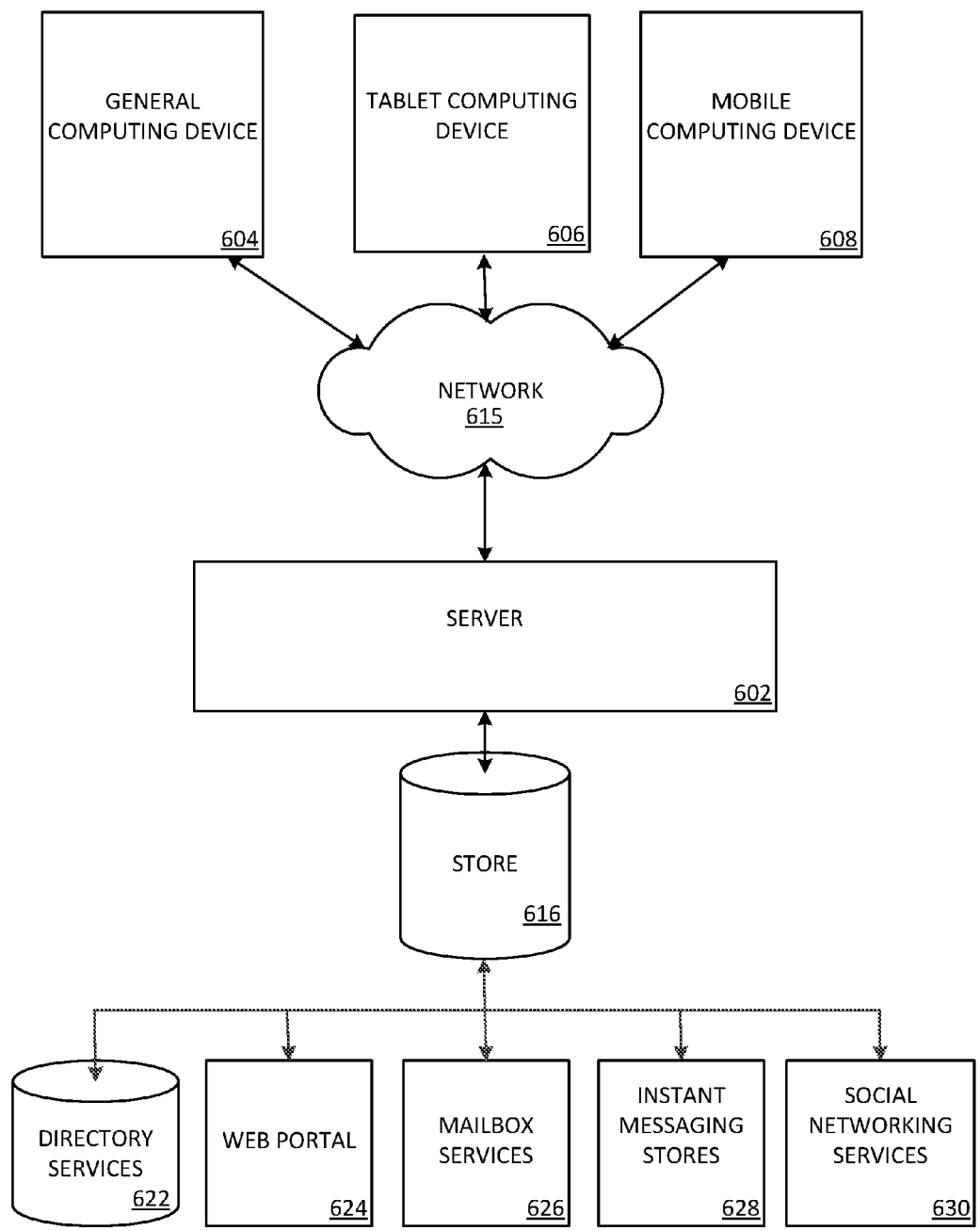
FIG. 6 is a simplified block diagram of a distributed computing system in which aspects of the present disclosure may be practiced.

FIG. 6 illustrates one aspect of the architecture of a system for processing data received at a computing system from a remote source, such as a personal computer 604, tablet computing device 606, or mobile computing device 608, as described above. Content displayed at server device 602 may be stored in different communication channels or other storage types. For example, various documents may be stored using a directory service 622, a web portal 624, a mailbox service 626, an instant messaging store 628, or a social networking site 630. The server device 602 may provide data to and from a client computing device such as a personal computer 604, a tablet computing device 606 and/or a mobile computing device 608 (e.g., a smart phone) through a network 615. By way of example, the computer system described above may be embodied in a personal computer 604, a tablet computing device 606 and/or a mobile computing device 608 (e.g., a smart phone). Any of these embodiments of the computing devices may obtain content from the store 616, in addition to receiving graphical data useable to be either pre-processed at a graphic-originating system, or post-processed at a receiving computing system.

Figure 7:
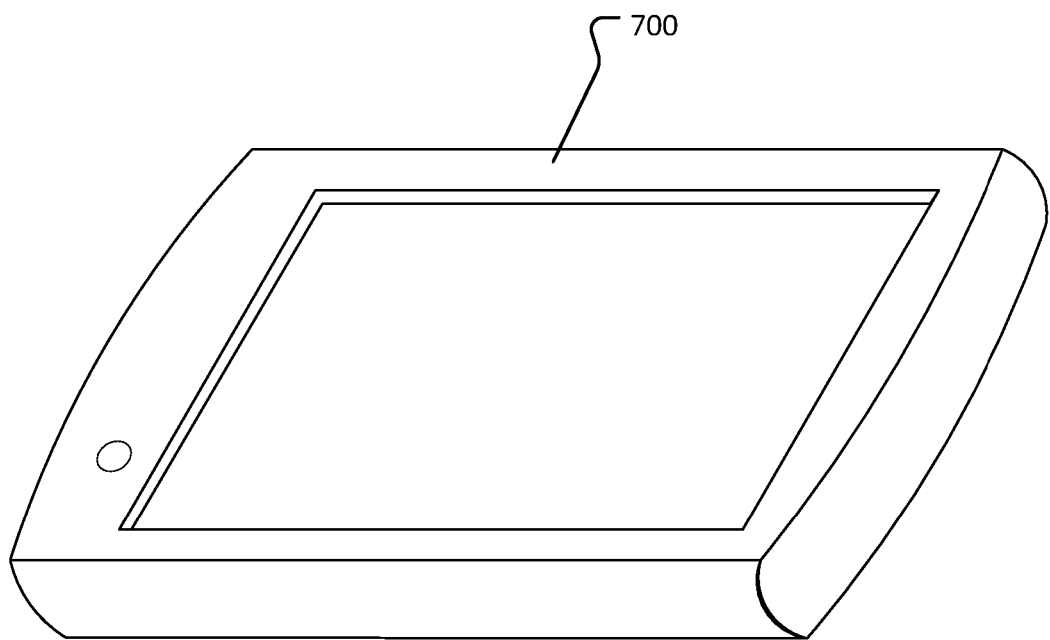
FIG. 7 illustrates a tablet computing device for executing one or more aspects of the present disclosure.

FIG. 7 illustrates an exemplary tablet computing device 700 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   memory coupled to the at least one processor, the memory comprising computer executable instructions that, when executed by the at least one processor, performs a method for identifying good abandonment using gesture movement, the method comprising:
   receiving first query data;
   receiving a first input comprising gesture data;

determining a classification of one or more abandoned queries using the gesture data;
generating feature data from the one or more abandoned queries;
generating metrics data using the feature data; and
training a model using at least one of the feature data and the metrics data.

2. The system of claim 1, wherein the first input correlates to a task, the task associated with one or more queries and one or more search results.

3. The system of claim 2, wherein determining the classification of the one or more abandoned queries comprises:
determining a sequence order for the one or more queries; and
identifying a final query in the sequence.

4. The system of claim 1, wherein the first input further comprises non-gesture data, the non-gesture data comprising at least click data for one or more search results.

5. The system of claim 1, wherein the gesture data comprises at least swipe data for one or more search results.

6. The system of claim 5, wherein the gesture data further comprises visibility data, the visibility data corresponding to a visibility of content on a display screen of a client device.

7. The system of claim 1, wherein generating the feature data comprises identifying portions of the gesture data that correspond to one or more features, wherein the features are predefined.

8. The system of claim 7, wherein identifying the portions of gesture data comprises using at least one of pattern-matching techniques, a rule set and a machine-learned model.

9. The system of claim 1, wherein generating the feature data includes determining one or more features using the one or more abandoned queries.

10. The system of claim 1, wherein generating metrics includes determining one or more scores for the feature data, wherein the one or more scores represent a correlation between the feature data and a user satisfaction.

11. The system of claim 1, further comprising:
receiving second query data;
receiving a second input;
applying the second input to the model; and
receiving an output from the model, the output comprising at least an abandonment determination.

12. The system of claim 11, wherein the abandonment determination includes classifying one or more search results in the second input as corresponding to at least one of good abandonment and bad abandonment.

13. The system of claim 11, further comprising:
collecting as collected data at least one of the second input and the output; and
generating satisfaction data for the model using the collected data.

14. A method for identifying good abandonment using gesture movement, the method comprising:
receiving first query data;
receiving a first input comprising gesture data;
determining a classification of one or more abandoned queries using the gesture data;
generating feature data from the one or more abandoned queries;
generating metrics data using the feature data;
training, by a first device, a model using at least one of the feature data and the metrics data;
receiving the trained model; and
using the trained model to classify abandonment.

15. The method of claim 14, wherein the first input correlates to a first task, the first task associated with one or more queries and one or more search results, the one or more search results being associated with corresponding gesture data.

16. The method of claim 14, wherein the one or more abandoned queries are determined using at least one of: a task identifier, a timestamp, a resource identifier, a task/query termination indicator and a placement within a list.

17. The method of claim 14, wherein generating the feature data comprises:
identifying one or more generic feature groups using the feature data; and
clustering the feature data into the one or more generic feature groups.

18. The method of claim 14, wherein training the model comprises:
applying at least a portion of the gesture data to the model; and
applying at least a portion of the non-gesture data to the model.

19. The method of claim 14, further comprising:
receiving second query data;
receiving a second input correlated to a second task;
applying the second input to the model;
receiving an output from the model, the output comprising at least an abandonment determination for one or more queries associated with the second task;
collecting as collected data at least one of the second input and the output; and
generating satisfaction data for the model using the collected data, wherein the satisfaction data describes a user behavior at a task level.

20. A computer-readable media storing computer executable instructions that when executed cause a computing system to perform a method of identifying good abandonment using gesture movement, the method comprising:
receiving first query data;
receiving a first input comprising gesture data and non-gesture data;
determining a classification of one or more abandoned queries using the gesture data and non-gesture data;
generating feature data from the one or more abandoned queries;
generating metrics data using the feature data;
training a model using at least one of feature data and the metrics data;
receiving a second input;
applying the second input to the model; and
receiving an abandonment determination from the model.

* * * * *